United States Patent
Thorngren

(10) Patent No.: US 10,856,521 B1
(45) Date of Patent: Dec. 8, 2020

(54) SOLAR TIMER CIRCUIT

(71) Applicant: TEXAND Corporation, Lake Dallas, TX (US)

(72) Inventor: John T. Thorngren, Shady Shores, TX (US)

(73) Assignee: TEXAND CORPORATION, INC., Lake Dallas, TX (US)

( * ) Notice: Subject to any disclaimer, the term of this patent is extended or adjusted under 35 U.S.C. 154(b) by 0 days.

(21) Appl. No.: 16/866,176

(22) Filed: May 4, 2020

Related U.S. Application Data

(60) Provisional application No. 62/921,155, filed on Jun. 4, 2019, provisional application No. 62/974,416, filed on Dec. 9, 2019.

(51) Int. Cl.
*A01K 5/02* (2006.01)
*G05B 19/042* (2006.01)

(52) U.S. Cl.
CPC ........ *A01K 5/0291* (2013.01); *G05B 19/0426* (2013.01); *G05B 2219/23196* (2013.01); *G05B 2219/25278* (2013.01); *G05B 2219/37117* (2013.01)

(58) Field of Classification Search
CPC .............. A01K 5/0291; G05B 19/0426; G05B 2219/37117; G05B 2219/23196; G05B 2219/25278
See application file for complete search history.

(56) References Cited

U.S. PATENT DOCUMENTS

| | | | |
|---|---|---|---|
| 5,808,294 A * | 9/1998 | Neumann | H05B 47/11 250/214 AL |
| 5,808,295 A | 9/1998 | Takeda et al. | 250/216 |
| RE38,036 E | 3/2003 | Neumann | 250/214 AL |
| 2019/0014742 A1 | 1/2019 | Leggett et al. | |

OTHER PUBLICATIONS

Sunrise Sunset Times of Nome, AK, URL: https://sunrise.maplogs.com/nome_ak_usa.35113.html, 10 pages, Retrieved on May 15, 2020.
Sunrise Sunset Times of Rio Gallegos, El Calafate, Santa Cruz, Argentina, URL: https://sunrise.maplogs.com/r_o_gallegos_el_calafate_santa_cruz_argentina.175124.html, 13 pages, Retrieved on May 15, 2020.
Sunrise and Sunset Times in Quito, Ecuador, URL: https://sunsetsunrisetime.com/sun/quito_(ecuador), 6 pages, Retrieved on May 15, 2020.
"Free Circuit Diagrams," URL: http://www.free-circuit-diagrams.com/timers/page-1/290/24-hour-timer, 3 pages, Retrieved on May 15, 2020.

* cited by examiner

*Primary Examiner* — Tony Ko
(74) *Attorney, Agent, or Firm* — Slayden Grubert Beard PLLC

(57) ABSTRACT

A timing circuit is provided comprising a light sensing component operable to generate a raw solar signal, a solar signal regulator comprising a voltage regulator and a low-pass filter, the solar signal regulator coupled to the raw solar signal and generating a regulated solar signal, a comparator coupled to the regulated solar signal and a reference value, the comparator configured to assert a solar output signal when the regulated solar signal exceeds the reference value, and a timing circuit coupled to the solar output signal and configured to assert a timer output signal a preset delay duration after the solar output signal is asserted, and to maintain the timer output signal for a preset output duration.

20 Claims, 14 Drawing Sheets

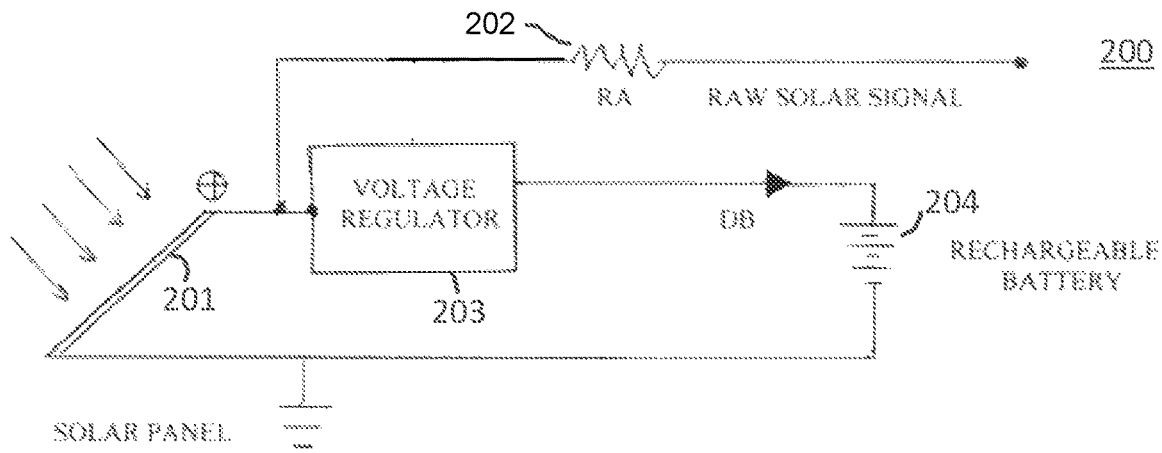
FIG 2 SOLAR PANEL CHARGER AS SOLAR SENSOR
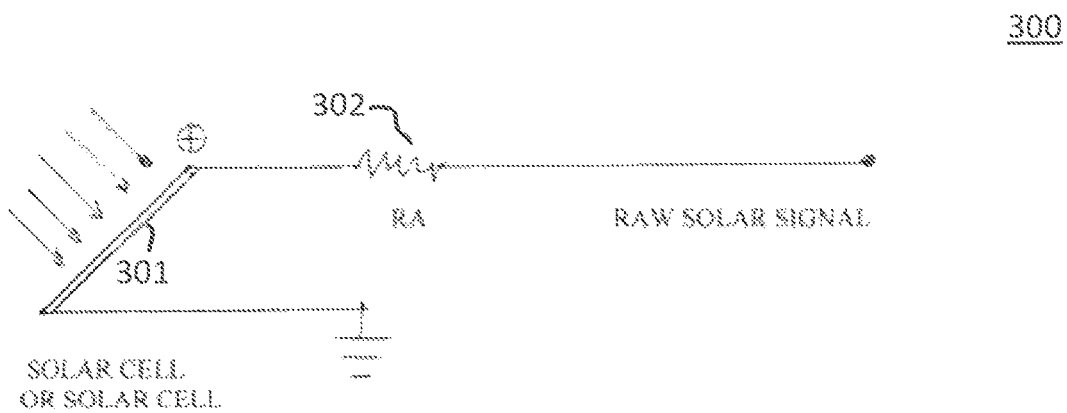
FIG 3 SOLAR PANEL-SOLAR CELL
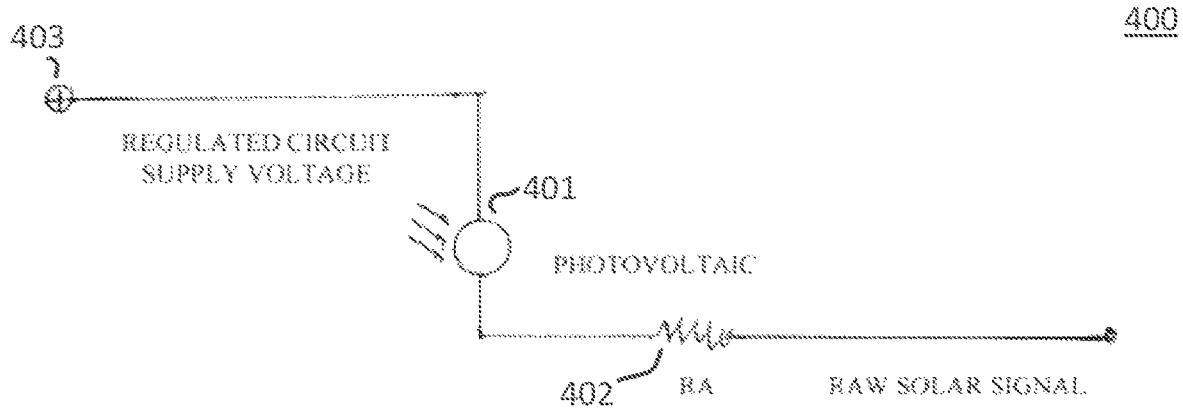
FIG 4 VOLTAGE SUPPLIED PHOTOVOLTAIC

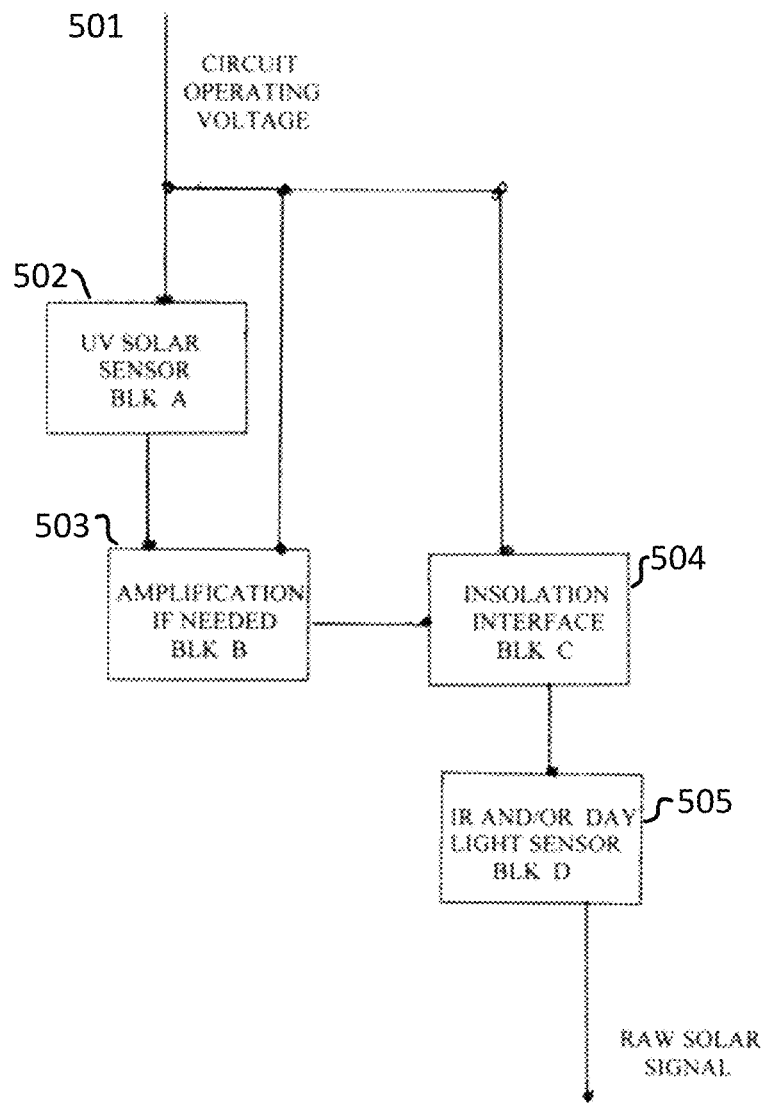
FIG 5 SOLAR FILTER CICRUIT

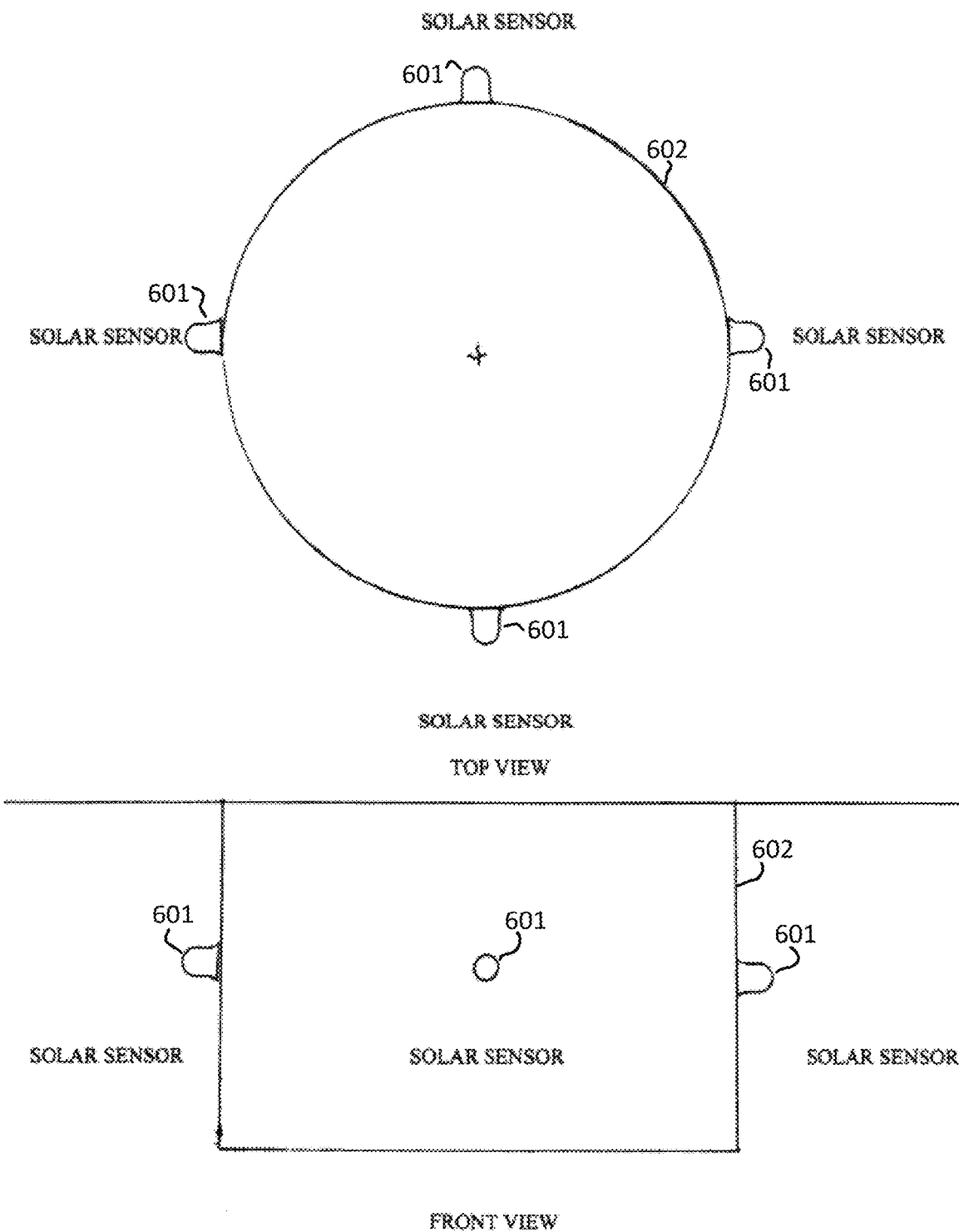
FIG. 6 MULTIPLE SOLAR SENSOR CONTRIBUTION

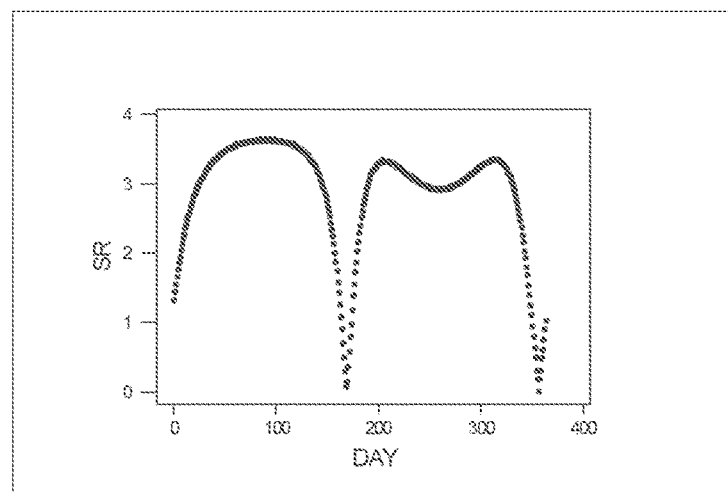
SUNRISE
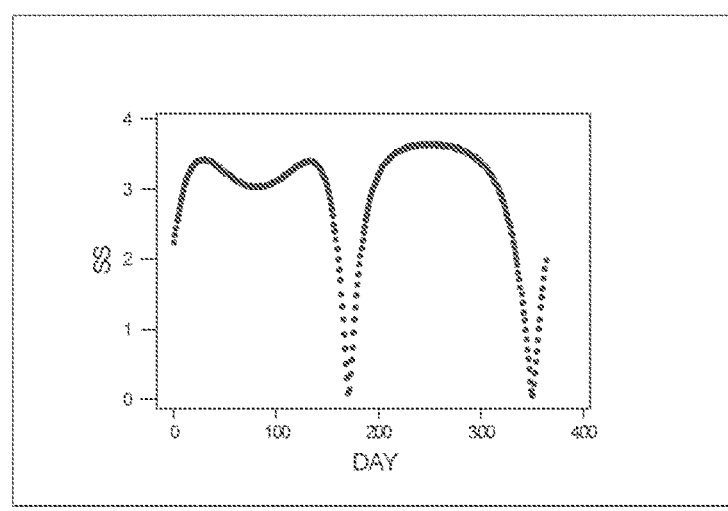
SUNSET
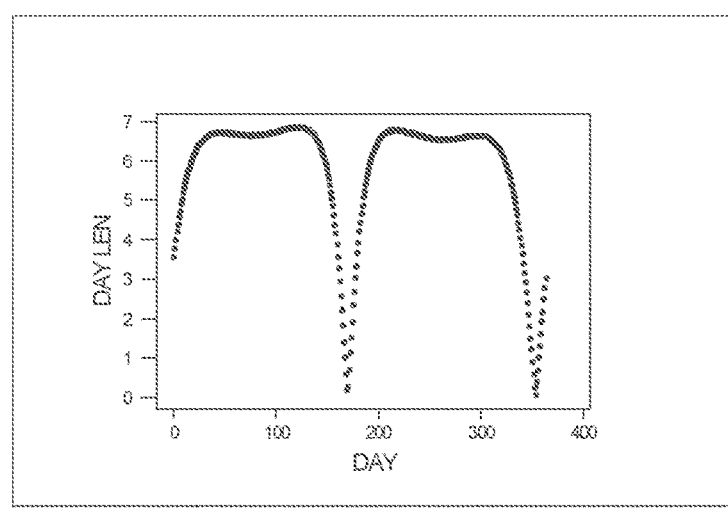
DAYLIGHT LENGTH
FIG. 7 SUCCESSIVE DAILY TIME DIFFERENCES – NOME, ALASKA, 2019

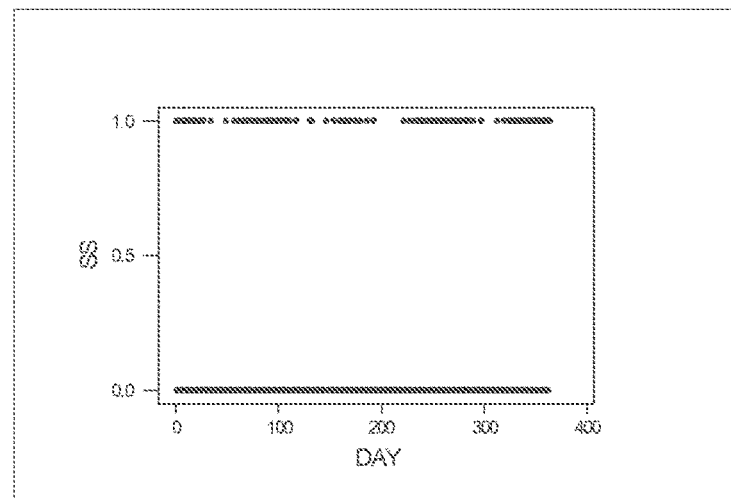
SUNRISE
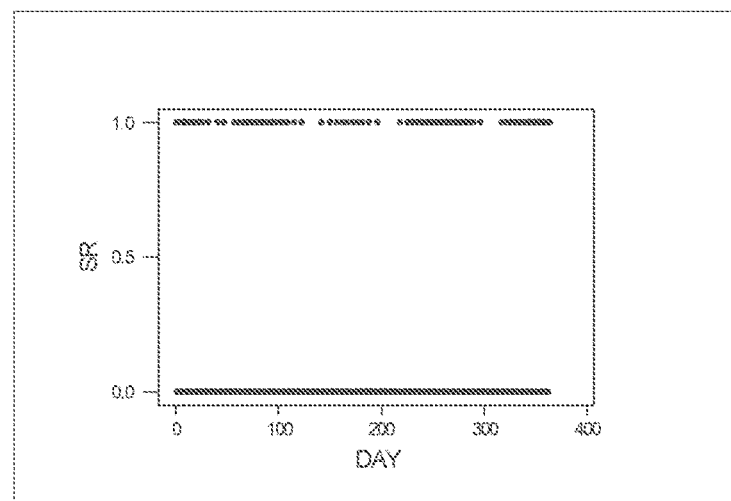
SUNSET
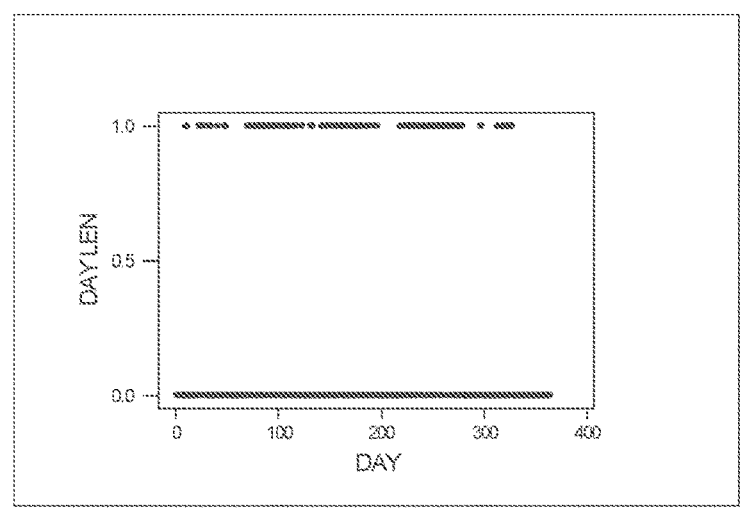
DAYLIGHT LENGTH
FIG. 8 SUCCESSIVE DAILY TIME DIFFERENCES -- QUITO, ECUADOR, 2019

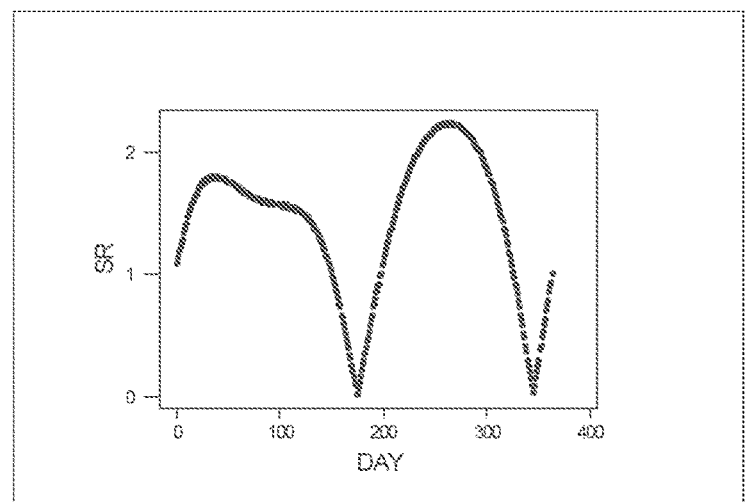
SUNRISE
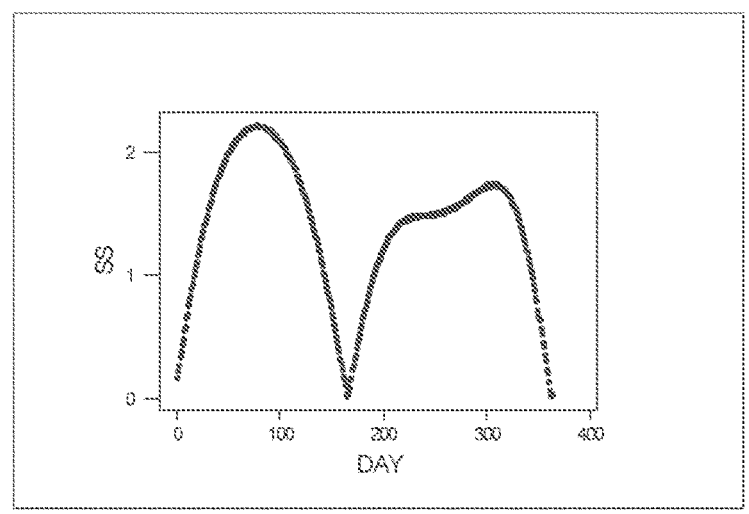
SUNSET
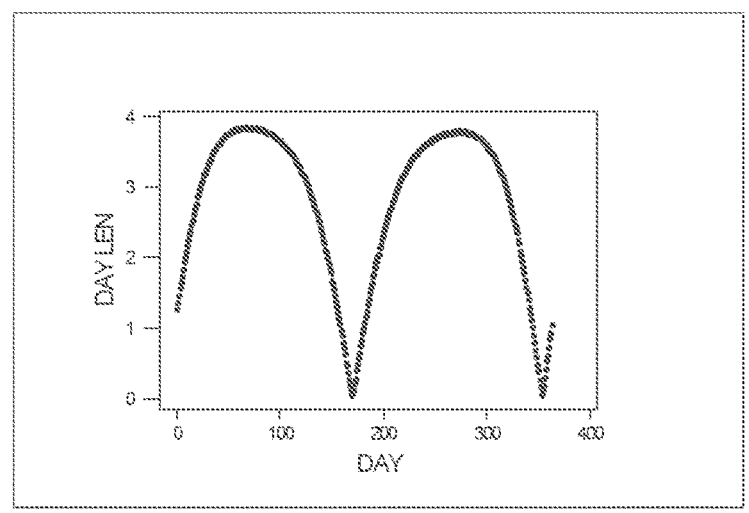
DAYLIGHT LENGTH
FIG. 9 SUCCESSIVE DAILY TIME DIFFERENCES – RIO GALLEGOS, ARGENTINA, 2019

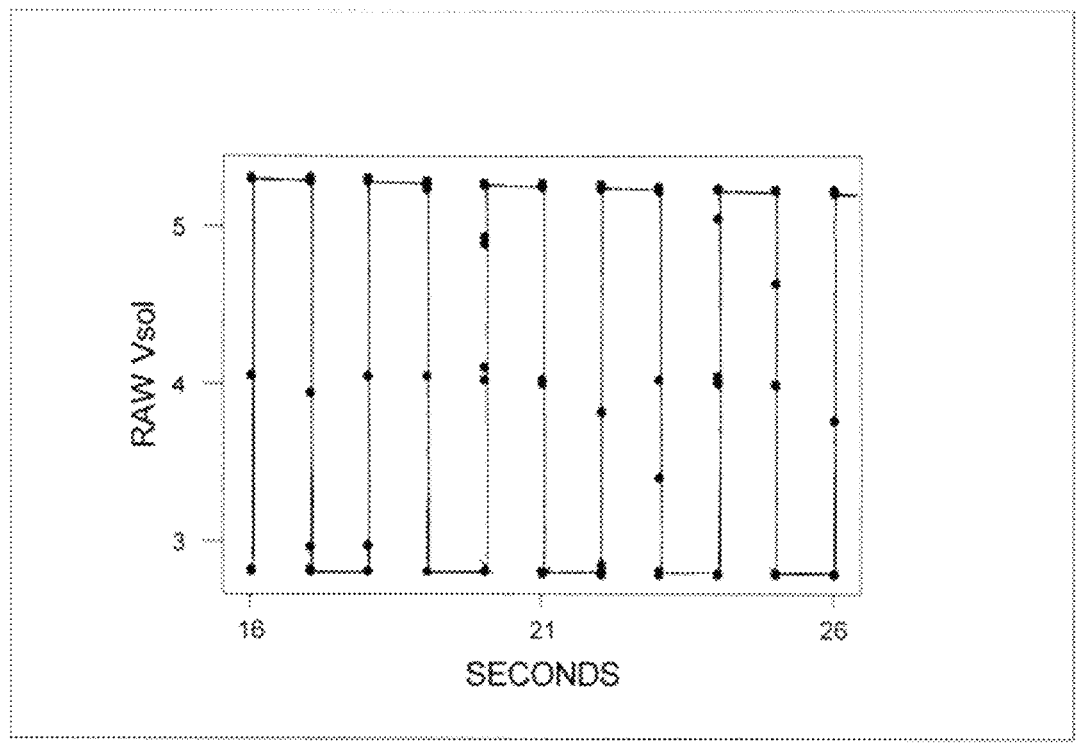
FIG. 10 LED OSCILLATIONS IN CERTAIN SOLAR PANELS

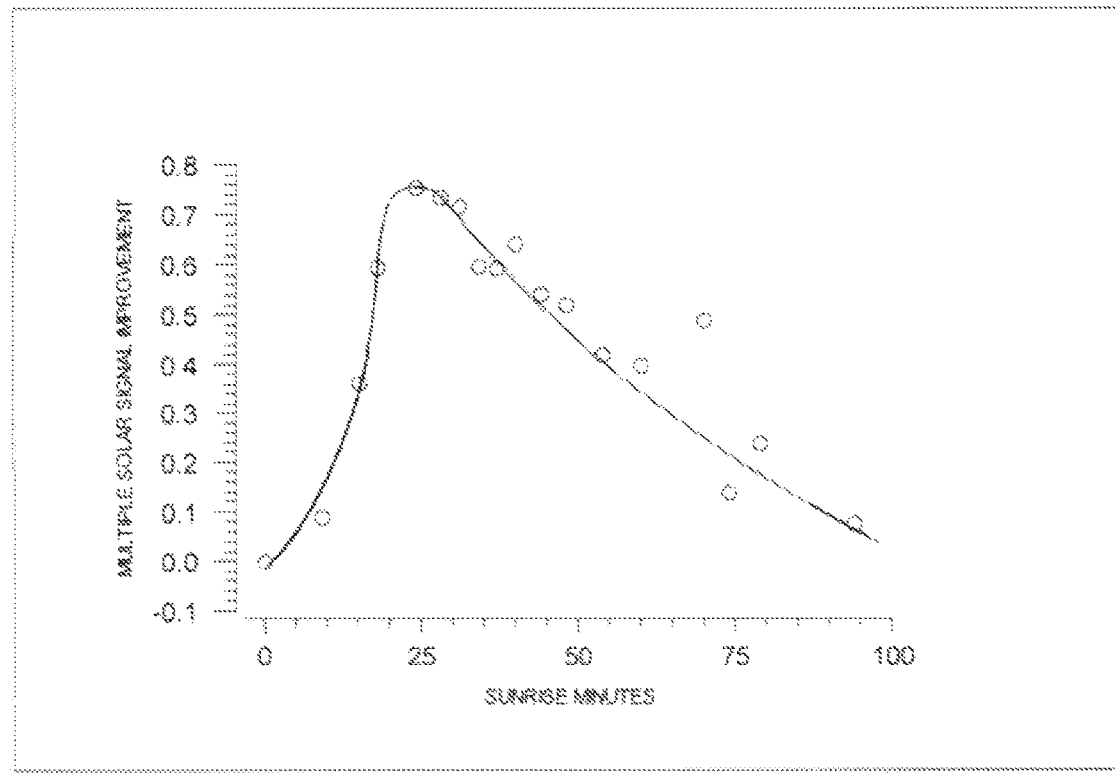
FIG 12 SOLAR SIGNAL IMPROVEMENT FOR MULTIPLE (FOUR) SOLAR SENSORS VERSUS ONE SENSOR

SOLAR TIMER CIRCUIT

PRIORITY

The present application claims priority to the following U.S. Provisional application Ser. No. Unknown[1], filed Apr. 8, 2019; Ser. No. 62/921,155, filed Jun. 4, 2019; and Ser. No. 62/974,416, filed Dec. 9, 2019 the entire contents of each are hereby incorporated by reference.

[1] This provisional application was mailed with a certified mail identifier 7017 2680 0000 5740 4854. The USPS tracking system shows the application was mailed on Apr. 2, 2019 and received on Apr. 6, 2019. The USPTO accepted delivery on Apr. 8, 2019 by stamping the return receipt card.

TECHNICAL FIELD

The present disclosure relates to a timing circuit and, more particularly, a timing circuit that tracks solar timing. More particularly, this disclosure relates to electronic circuits that sense Sunrise and/or Sunset from the preceding day to output an activation signal, e.g., one that may trigger an animal game feeder to spread feed at preset time intervals at or near Sunrise or before Sunset that is independent of Wall Clock Time, a time that changes from day to day because of the earth's seasons.

BACKGROUND

Many applications of timing circuits require or benefit from accurately determining the daily solar schedule for the current location, for example. A rancher may set a deer feeder to disperse corn or other feed certain times to attract game animals to that location at a time when sufficient light is present to safely and reliably photograph or hunt the game animals. Prior solutions required adjusting timers throughout the season to track the current dawn/dusk cycle or resulted in feedings triggered at inopportune times based on false/misleading inputs.

BRIEF DESCRIPTION OF THE DRAWINGS

FIG. 2 illustrates a circuit for charging a solar panel and operating as a solar sensor, according to an embodiment.

FIG. 3 illustrates a solar panel circuit operating as a solar sensor according to an embodiment.

FIG. 4 illustrates a photovoltaic device operating as a solar sensor according to an embodiment.

FIG. 5 illustrates a solar filter circuit according to an embodiment.

FIG. 6 illustrates an arrangement of solar sensors on a housing according to an embodiment.

FIG. 7 illustrates a graphical display of successive daily timed differences for sunrise, sunset, and daylight length for 2019 according to data from Nome, Ak.

FIG. 8 illustrates a graphical display of successive daily timed differences for sunrise, sunset, and daylight length for 2019 according to data from Quito, Ecuador.

FIG. 9 illustrates a graphical display of successive daily timed differences for sunrise, sunset, and daylight length for 2019 according to data from Rio Gallegos, Argentina.

FIG. 10 illustrates LED oscillations in certain solar panels.

FIG. 12 illustrates a graphical display comparing the sensor quality of a single sensor embodiment with a multi-sensor embodiment.

SUMMARY

Figure 1A:
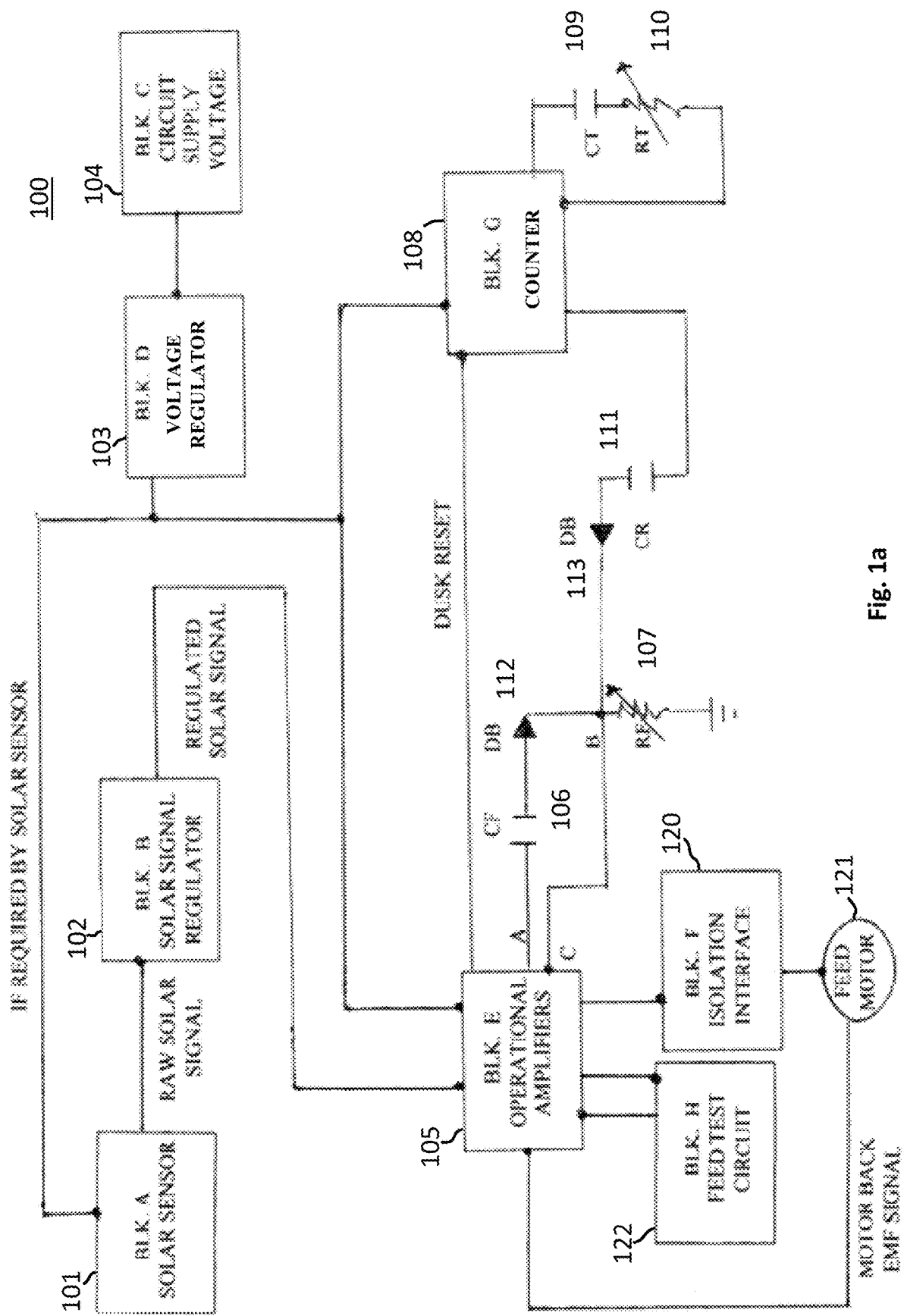
FIG. 1a illustrates a block diagram of a timing circuit, according to an embodiment.

According to certain embodiments, a timing circuit is provided comprising a light sensing component operable to generate a raw solar signal, a solar signal regulator comprising a voltage regulator and a low-pass filter, the solar signal regulator coupled to the raw solar signal and generating a regulated solar signal, a comparator coupled to the regulated solar signal and a reference value, the comparator configured to assert a solar output signal when the regulated solar signal exceeds the reference value, and a timing circuit coupled to the solar output signal and configured to assert a timer output signal a preset delay duration after the solar output signal is asserted, and to maintain the timer output signal for a preset output duration. According to certain embodiments, said reference value subsequently falls below its trigger value upon solar activation to eliminate spikes and chatter.

In combination with one or more of the disclosed embodiments, the timing circuit further comprises an electrical isolation interface coupling the timer output signal with a power supply to drive a motor control output operable to drive a motor for throwing feed wherein the electrical isolation interface protects the timing circuit from induced power spikes produced by the motor. In certain embodiments, the timing circuit further comprises a battery charging voltage regulator coupled between the raw solar signal and a battery connection terminal operable to supply a battery charging current. In certain embodiments, the light sensing component is selected from: an optical transistor coupled to a power supply, an optical resistor coupled to a power supply, a monocrystalline solar cell, a polycrystalline solar cell, a thin film amorphous solar cell, and a UV light sensor. In certain embodiments, the timing circuit further comprises a sunset detection circuit selected from: an inverting input of an operational amplifier coupled to the regulated solar signal and the output coupled to a sunset signal, an input of an inverter coupled to the regulated solar signal and an output of the inverter driving the sunset signal, and a ripple counter with a clock input coupled to the regulated solar signal and an output of a fourth or higher stage driving the sunset signal; and a dusk counter measuring elapsed time, a reset input of the dusk counter coupled to the sunset signal; and a second timing circuit coupled to an output of the dusk counter and configured to assert the timer output signal upon assertion of the output of the dusk timer and configured to maintain the timer output signal for the preset output duration. In certain embodiments, the dusk counter is a ripple counter clocked with resistor and capacitor in series and the output of the dusk timer is the fourteenth stage output. In certain embodiments, the timing circuit further comprises an anti-dump circuit coupled between the electrical isolation interface and the motor.

According to certain embodiments, a timing circuit is provided comprising a light sensing component operable to generate a raw solar signal, a solar signal regulator comprising a voltage regulator and a low-pass filter, the solar signal regulator coupled to the raw solar signal and generating a regulated solar signal, a processor with an input coupled to the regulated solar signal and an output representing a solar output signal, and a non-transient memory coupled to the processor comprising instructions that when executed on the processor perform steps comprising determining a dawn event based at least in part on a non-transient regulated solar signal, waiting a preset delay duration after the dawn event, and after the preset delay, asserting the solar output signal for a preset output duration.

According to certain embodiments, a method of timing is provided comprising steps of receiving a solar signal generated by a light sensing component, comparing the solar signal to a predetermined threshold to regulate the solar signal, applying a low-pass filter to the solar signal to eliminate transient values, determining a dawn event based at least in part on the non-transient regulated solar signal, waiting a preset delay duration after the dawn event, and after the preset delay, asserting a solar output signal for a preset output duration. According to certain embodiments, the threshold value is a reference voltage that when triggered by a solar event goes higher than the trigger value to eliminate spikes and chatter.

DETAILED DESCRIPTION

Certain embodiments of the present disclosure relate to a solar-sensing, electronic circuit that may activate an electronic device such as an animal Game Feeder motor. One goal of certain embodiments is to distribute feed near Dawn and Pre-Dusk at a scheduled time that is sufficiently accurate for feeding game and that is independent of seasonal time changes when Sunrise or Sunset occurs. Game Feeders that depend on Wall Clock Time to Throw Feed can tend toward or after Sunset as the Fall hunting season progresses. Game animals are well trained to arrive when feed is thrown on a schedule. Thus, if a feeder discharges at or into the night, they will feed when it is dark and not come around in the day. Game cameras verify this habit.

Certain embodiments provide a solar sensing circuit that is indifferent to cloud changes, lighting flashes, headlamps, car lights, and other intermittent light sources.

The following definitions provide context for the present disclosure:

Active Solar Sensor—a Solar Sensor that requires an external power source to function.
Dawn—a point in time at or near Sunrise that triggers an activation or operation, a circuit change in this invention. Dawn is an action event; Sunrise is a solar event.
Daylight Length—the time difference between Sunset and Sunrise.
DB—a blocking diode.
Dusk—a point in time at or near Sunset that triggers an activation or operation, a circuit change in this invention. Dusk is an action event; Sunset is a solar event.
Feed Throw Time—the point in the day at Dawn or Pre-Dusk when this circuit may activate the distribution of feed.
Feed Time Interval—the time period interval for which the Game Feeder Distributor is activated, usually in the order of several seconds.
Game Feeder—a device that may distribute feed, e.g., dried corn, at a game site.
Game Feeder Battery—an electrical storage device, e.g., one or more dry cell or rechargeable batteries, used to power the Game Feeder.
Game Feeder Distributor—usually, but not limited to, an electric motor with a propeller that spins feed out in a radial direction.
Ground Signal—system ground also referred to as negative.
Isolation Interface—a component such as a relay, opto-isolator, transistor, Mosfet or similar device through which the activating signal operates another device while electrically isolating the activating signal from power disturbances caused by the operated device.
Passive Solar Sensor—a Solar Sensor generates power from solar radiation, e.g., from visible or near visible light.
Pre-Dusk—preset time(s) prior to Dusk.
Raw Solar Signal—a signal that responds when the Solar Sensor is activated or deactivated, and in this invention is a positive voltage when light strikes the Solar Sensor and slightly positive or nil when light is absent or slightly positive or nil when light is present.
Regulated Solar Signal—the Raw Solar Signal that has been processed, e.g., attenuated, filtered and/or shaped, as described with regard to certain embodiments.
Solar Cell—a single photovoltaic device, e.g., one producing approximately ½ volt DC when placed in direct sunlight.
Solar Panel—a group of Solar Cells connected in series and/or parallel to increase the output voltage and/or current respectfully.
Solar Sensor—a device that outputs a signal in response to solar radiation, e.g., a photoresistor, phototransistor, or solar cell.
Sunrise—generally accepted when the rising Sun's center is 50 arcminutes below the horizon.
Sunset—generally accepted when the setting Sun's center is 50 arcminutes below the horizon.
Throw Feed—the spreading of feed at a game site from the interaction of an activation signal to the Game Feeder Distributor.
Wall Clock Time—Greenwich Mean Time less a correction for the time zone location, namely the time displayed on a wall clock, wristwatch, etc.

Aspects of the present disclosure will be understood in reference to the figures as described below.

FIG. 1a illustrates a block diagram of a timing circuit, according to an embodiment. System 100 is an electrical circuit diagram of a controller for a deer feeder. System 100 includes solar sensor 101, solar signal regulator 102, voltage regulator 103 and circuit supply voltage 104. System 100 further includes operational amplifiers 105, capacitors (106, 109, and 111), variable resistors (107 and 110), blocking diodes (112 and 113), and counter 108. System 100 further includes isolation interface 120, feed motor 121, and feed test circuit 122.

In FIG. 1a, solar sensor 101 may generate a raw solar signal. Solar sensor 101 may be an optical resistor, photocell, photodiode, LED used as a photodiode, or a transistor. A passive solar sensor 101 may not require an additional power supply to provide a raw solar signal. An active solar sensor 101 may be coupled to power supply 104 via voltage regulator 103 to provide a raw solar signal. Solar sensor 101 may be a solar cell coupled to a voltage multiplier to obtain a usable voltage. Solar sensor 101 may be a set of solar cells couple in series and/or parallel to obtain usable voltage and current to drive the timer circuit. Solar sensor 101 may include mono- or poly-crystalline cells to provide a response to a broad spectral range of light. Solar sensor 101 may be a thermocouple, solid state thermometer, a mercury thermostat, or a Crooker's radiometer. In some embodiments, maximum sunlight may translate to a maximum voltage at the raw solar signal and minimum sunlight translates to minimum voltage. In some embodiments, an inverted signal may be produced.

Solar signal regulator 102 may provide a regulated solar signal suitable for driving the timing circuit. Solar signal regulator 102 may filter out transient signals such as those generated at night by lightening or lights from a passing vehicle. Solar signal regulator 102 may filter out transient signals generated around sunrise, e.g., transient voltages generated in low light levels. Solar signal regulator 102 may filter out low voltage signals, e.g., stable voltages generated in low light levels. Solar signal regulator 102 may comprise a voltage regulator. Solar signal regulator 102 may comprise a low-pass filter, e.g., an inline resistor coupled to a capacitor that is also coupled to the circuit ground.

Raw Solar Signal Attenuation

If the solar sensor is at an extreme latitude, e.g., near the Arctic and Antarctic circles, there may be considerable daylight after Sunset. To prevent a false signal, a solar signal regulator may comprise a variable resistor connected in series with the Raw Solar Signal and may be preset to lower its voltage level beneath the incident light value after Sunset in these regions.

Solar Signal Regulator

Solar signal regulator 102, may include a voltage regulator to drop the voltage well below the regulated supply voltage. Regulation to a low value may help filter out lighting spikes, both natural and artificial. Solar signal regulator 102 may also contain a snubber circuit consisting of resistors and capacitors to further remove transient raw solar signals, e.g., those produced by lighting spikes or other non-solar light occurrences. Some manufacturers of Solar Panels include a blinking light, usually an LED, to advise the user that the panel is generating a current. As Sunrise approaches or Sunset falls, the Raw Solar Signal becomes low, and the intermittent blinking injects unwanted spikes into the circuitry that could cause oscillating Feed Throw. FIG. 10 shows the actual oscillations in such a Solar Panel. Note that the slope of the peak voltage is negative indicating Sunset. The voltage regulation of the Raw Solar Signal to a low value in conjunction with the snubber circuit eliminates these oscillations.

Also, some Solar Sensors such as a photo diode or LED used as a photodiode may require voltage/current amplification that may be accomplished with an Operational Amplifier used in a forward or transimpedance mode. Amplification, if needed, may be supplied in this solar signal regulator 102 by any known applicable method.

A Zener diode may be included in the line connecting the Raw Solar Signal to the Solar Signal Regulator or in the line connecting to the snubber circuit. The Zener diode functions in this embodiment as an inrush current limiter for lighting/lightning spikes at night thus preventing false resets. It is noted that inrush current limiting devices other than a Zener diode could also be used.

Voltage regulator 103 and circuit supply voltage 104 may provide a regulated power supply for timing circuit 100. Circuit supply voltage 104 may be a non-rechargeable battery or pack of batteries connected in series and/or parallel to provide sufficient operating voltage and current. Circuit supply voltage 104 may be a rechargeable battery such as a gel battery, a lithium ion battery, a NiMH battery, or a lead acid battery. Circuit supply voltage 104 may be sized to power both timing circuit 100 and a larger load (e.g., feed motor 121 or area lights). The Circuit Supply Voltage 104 may be Direct Current, DC, and may be rechargeable such as through a rechargeable battery or non-rechargeable battery such as a dry cell. The Supply Voltage may be Alternating Current, AC, converted to DC.

One of the objects of this disclosure is to automatically reset if the Supply Voltage is disconnected and reconnected. This may occur from a user change-out of the battery or from intermittent connections of a Solar Panel for recharging. For feeders that do not automatically reset, such interruptions in the Supply Voltage can alter the Feeding Throw Time and result in nocturnal feeding. Animals are wise enough to pattern feeders. If a feeder discharges at night, they will not come around in the day. Game cameras verify this habit. Most Wall Time Clock Feeders, reset to noon on Supply Voltage interruption but maintain their preset Feed Throw Times. This will result in nocturnal feeding.

An inexpensive Voltage Regulator may be included in regulator 102 to protect a rechargeable battery from overcharging. This voltage regulator may be adjustable with a selector switch for the popular voltages, e.g., 6.0V, 9.0V, 12.0V, etc. As a generalization, the voltage from the regulator may correspond to the nominal battery voltage plus approximately 0.3 volts per battery cell and could, of course, be fixed for a singly supplied battery voltage.

A fuse may also be included in regulator 102 to protect the circuit from short circuits. A diode may be included in the line after the fuse with its anode connected to the cathode of the Circuit Supply Voltage and its cathode connected to the anode of the Circuit Supply Voltage. When the polarity of the Circuit Supply Voltage is incorrectly reversed, the fuse will blow and prevent component damage in this circuit.

Another embodiment of this invention includes replacing the Voltage Regulator noted previously that could be included in FIG. 2, with a current limiting device. As noted, the disclosed timing circuit may use very little operating current so that a trickle charge from a current limiting device (e.g., a current limiting diode) may be adequate to maintain the battery health. It is envisioned that such a low charging current could also be connected to any battery voltage size without circuit changes and to any type of battery even those that are not rechargeable without harming said battery. Thus, a Solar Panel or Solar Cell may be used as a Solar Sensor to generate a Raw Solar Signal and also can be connected to the battery either in a charging or non-charging situation and is completely independent of battery voltage and/or type.

Operational amplifiers 105 comprises one or more operational amplifiers for determining timing events. Operational amplifiers 105 may be used as comparators. In certain embodiments, operational amplifiers 105 may be differential voltage comparators. Output A of operational amplifiers 105 may be coupled to capacitor 110 to signal a solar event. Input C of operational amplifiers 105 may be coupled to point B, which may couple terminals of capacitors 106 and 111 as well as a terminal of resistor 107. Operational amplifiers 105 may trigger a timer event signal output to isolation interface 120 when the voltage of input C exceeds a predetermined threshold.

Circuit Operating Voltage

Another object of this disclosure is to eliminate Feed Throw Time errors that might result from a drifting battery voltage. Thus, regulator 102 may comprise a voltage regulator to maintain a steady voltage to the Isolation Interface that helps prevent Feed Motor chatter and oscillations. Using a voltage regulator set below the Circuit Supply Voltage may allow this circuit to operate at any Circuit Supply Voltage that is higher than the regulated Circuit Operating Voltage.

Unattended Operation

Once the Game Feeder has been loaded and the user desired parameters have been set for the Feeding Time Interval and Pre-Dusk Feed Throw Time, there may be no need for the hunter to approach the Game Feeder before hunting. This keeps the area unpolluted with human scent that would otherwise scare the game. Also, most Game Feeders employ a cage around the Game Feeder unit to keep varmints from stealing feed at the Feed Distributor. This Unattended Operation feature eliminates the trouble and hassle of opening this cage to change Feed Time Intervals or Feed Throw. Further, with a careful choice of CMOS IC's, high omage resistors, etc., the circuit may be designed to run for extremely long periods unattended and without intervention and almost indefinitely with a Solar Panel for recharging a battery. Likewise, a voltage regulator (e.g., regulator 102) noted in Circuit Supply Voltage previously may protect the battery from overcharging and subsequently failing. In some embodiments, a current limiting diode (as discussed above) may protect the battery from overcharging and subsequently failing.

Interchangeability

Many embodiments easily interchange with current Game Feeders. This design may save the user considerable expense by allowing reuse of existing parts such as the housing, battery, and Game Feed motor. Some embodiments have the customary four (4) connections for most Game Feeders as follows:

1. Anode to the Circuit Supply Voltage
2. Cathode to the Circuit Supply Voltage
3. Anode to the Feed Motor
4. Cathode to the Feed Motor Dawn Throw The Regulated Solar Signal may be connected to an input of one of operational amplifiers 105. In this embodiment, operational amplifiers 105 may be operated in a comparator mode. Other devices such as a MOSFET, quad comparator, transistor, etc. could be used in lieu of Operational Amplifiers.

At Dawn, the Regulated Solar Signal voltage rises above an Operational Amplifier Reference value (Op Amp Reference) at an Op Amp input that triggers an output voltage rise at point A. One goal may be to provide a sharp rise in voltage to the Game Feed motor so as not to slow-burn the DC brushes, eliminate motor oscillations, or damage any parts in the Isolation Interface. This may be accomplished by lowering the Op Amp Reference upon the first instance of a voltage rise at Point A. This design may prevent further changes in the Regulated Solar Signal from yielding a false activation. Likewise, that in turn, raises the voltage at point B for a preset adjustable time interval through an RC circuit: Capacitor CF and variable Resistance RF. In this embodiment, when RF (resistor 107) is set to zero ohms the Feeding Time Interval is zero (off). Point B in turn triggers another Operational Amplifier 105 to activate the Isolation Interface 120 for as long as the voltage at Point B remains above the Op Amp Reference.

The Isolation Interface 105 may be, e.g., a relay, Mosfet, or Opto-isolator. The Op Amp Reference's lowered value, noted previously, protects not only the Feed Motor armature brushes but the components in the Isolation Interface as well.

Another means of protecting the circuitry of this apparatus includes a feedback circuit from the Game Feeder motor itself to eliminate oscillations from back EMF. Also, additional circuitry may lower the Op Amp Reference during the time interval that the Game Feeder motor is activated to also prevent oscillations.

CF and RF may be sized to yield an adjustable Feeding Time Interval in the range of zero to 60 seconds. For other timetable uses, CF and RF may be sized to yield an interval of hours or as long as there is sufficient daylight or dark.

Table II shows the Dawn data for this invention using a Solar Panel configuration of that noted in FIG. 3 for February and March of 2019 near Denton, Tex. Note that the average difference for Sunrise minus Dawn is 12 minutes, and that the standard deviation is 4.2 minutes. Using a significance level of 0.05, the Andersen-Darling p value of 0.105 indicates that one cannot conclude that the data is not normally distributed. However, these tests were conducted during a particularly cloudy and rainy period.

TABLE II

Dawn Throw, February/March, 2019 Near Denton, Texas.

| Number of Points | Sunrise minus Dawn Point in Minutes | | | | Anderson Darling |
|---|---|---|---|---|---|
| | AVG | Max | Min | Standard Deviation | p |
| 53. | 12.04 | 6.96 | −10.04 | 4.24 | 0.105 |

Such atmospheric conditions would skew the dawn point to later in the day. Using only the sunny-morning data, the average increases to 14.8, the standard deviation drops to 2.5, and the p value increases to 0.410. The max and min points are significantly improved. The data is summarized in Table IV. The improvement is slight indicating little effect from clouds, but these effects of a dark-rainy morning could be amplified, if desired, with circuit changes or with Solar Sensors more sensitive to infrared. This is an advantage because the game animals would wait to feed until the skies became clearer.

TABLE IV

Dawn Throw, Sunny Mornings, February/March, 2019 Near Denton, Texas.

| Number of Points | Sunrise minus Dawn Point in Minutes | | | | Anderson Darling |
|---|---|---|---|---|---|
| | AVG | Max | Min | Standard Deviation | p |
| 24 | 14.75 | 4.25 | −4.75 | 2.47 | 0.410 |

Dusk Reset—Ripple Counter

The Regulated Solar Signal may be connected to the input of a different Operational Amplifier 105 from that noted in the Dawn Throw. When said signal goes low and drops below the Op Amp Reference at Dusk, the output from the aforementioned Operational Amplifier 105 goes high and resets the Counter 108, which may be a Ripple Counter. When the output of this Op Amp goes high, it also increases the Op Amp Reference to help prevent false triggers from lighting spikes that may occur at night.

An additional circuit in the line resetting the Ripple counter may also prevent EMF peaks and other voltage spikes from the Feed Motor. This additional circuit may comprise a Zener diode in series with a capacitor. The capacitor allows the ripple Counter Reset to return to ground after reset. The Counter reset starts from zero at an adjustable frequency determined by RT and CT (capacitor 109 and resistor 110, respectively). This frequency is halved by each stage of Counter 108 or inversely, the time period is doubled by each stage. Thus, if the frequency were reset at Dusk to 0.1 Hz, then $$10(214)/(2*3600) = \text{approximately } 23 \text{ hours} \quad (4)$$

Then the last stage would start positive 23 hours in Wall Clock Time from the point of reset. The 2.0 in the denominator takes into account that we are only interested in the start of the positive cycle of the Ripple Counter frequency, that point at which the 14th stage output goes positive.

Pre-Dusk Throw—Counter

Knowing that there are 24 hours of Wall Clock Time for the earth to rotate about the Sun, and knowing that the error from basing this 24 hour period on the previous Dusk point is slight (at most several minutes), the output of the 14th stage of the Ripple Counter 108 can be used to set the Pre-Dusk Throw. This output may be connected to a different Operational Amplifier 105 input, from those previously mentioned and to a separate Feed Time Interval circuit as noted for Dawn through a separate capacitor 111 (CR) and blocking diode 113 (DB), to Point B in FIG. 1*a*. Sizing CR equal to CF and using RF in common will produce the same adjustable Feed Time Interval for both Dawn and Pre-Dusk.

Table III shows the Pre-Dusk data for this invention using a Solar Panel configuration of that noted in FIG. 3 for February and March of 2019 near Denton, Tex. CR and CF were chosen for roughly 1⅔ hours before Sunset. Note that the average difference for Sunrise minus the Pre-Dusk point 102 minutes, and that the standard deviation is 5.9 minutes. Using a significance level of 0.05, the Andersen-Darling p value of 0.319 indicates that one cannot conclude that the data is not normally distributed. However, these tests were conducted during a particularly cloudy and rainy period.

TABLE III

Pre-Dusk Throw, February/March, 2019 Near Denton, Texas

| | Sunrise minus Pre-Dusk Point in Minutes | | | | Anderson-Darling |
|---|---|---|---|---|---|
| # Points | AVG | Max | Min | Std. Dev. | p |
| 53 | 101.62 | 12.3 | −12.60 | 5.87 | 0.319 |

Such atmospheric conditions would skew the Pre-Dusk point to earlier on the following day. This is an advantage as noted in the Dawn Throw and could be achieved, if desired, simultaneously with those modifications noted there.

Feed Test Circuit

Feed Test Circuit 122 may allow the user to determine both the throw pattern and the amount of feed distributed. A delay for the Feed Time Throw may be included to protect the user's eyes and body from slinging feed. Feed Test Circuit in this embodiment uses the Dawn Throw activation to emulate the actual Feed Time Interval. One could connect the Feed Test Circuit with a selector switch to other feed points for their actual emulation.

Counter 108 may provide a mechanism for counting units of elapsed time. Counter 108 may be a 14-stage binary counter/divider. Counter 108 may comprise a cascade of 4-bit counters. In certain embodiments, counter 108 may be a ripple counter. The clock input of counter 108 may be coupled to capacitor 109 and resistor 110 forming a regular oscillator circuit. In some embodiments, capacitor 109 and resistor 110 may be replaced with a crystal oscillator circuit. The reset input of counter 108 may be coupled to the dusk reset output of operational amplifiers 105. In certain embodiments, a specific high-order bit of counter 108 may be coupled to capacitor 110 to signal a solar event. Counter 108 may be a CSS555/CSS555C by Custom Silicon Solutions, Inc., 18021 Cowan, Irvine, Calif. 92614; an ICM7555/7556 by Renesas Electronics Corporation (Intersil) TOYOSU FORESIA, 3-2-24 Toyosu, Koto-ku, Tokyo 135-0061, Japan; or an MC14521B, 24-Stage Frequency Divider from various manufacturers.

Isolation interface 120 may pass a timer event output signal from operational amplifiers 105 to feed motor 121 while isolating operational amplifiers from electrical noise produced by feed motor 121. Isolation interface 120 may be, e.g., a relay, opto-isolator, or power MOSFET.

Feed motor 121 may operate a feed spreader to broadcast animal feed such as dried corn. Feed motor 121 may be a direct current motor powered by a storage battery coupled to a solar charging system. Feed motor 121 may be an alternating current motor powered by a connection to the electrical mains. Feed test circuit 122 may bypass feed motor 121 to allow calibration and testing of timing circuit 100 without distributing feed. Test circuit 122 may connect between the regulated solar signal and the operational amplifiers to enable a delayed simulation of both the feed throwing pattern and the actual interval of time that is preset for throwing.

Figure 1B:
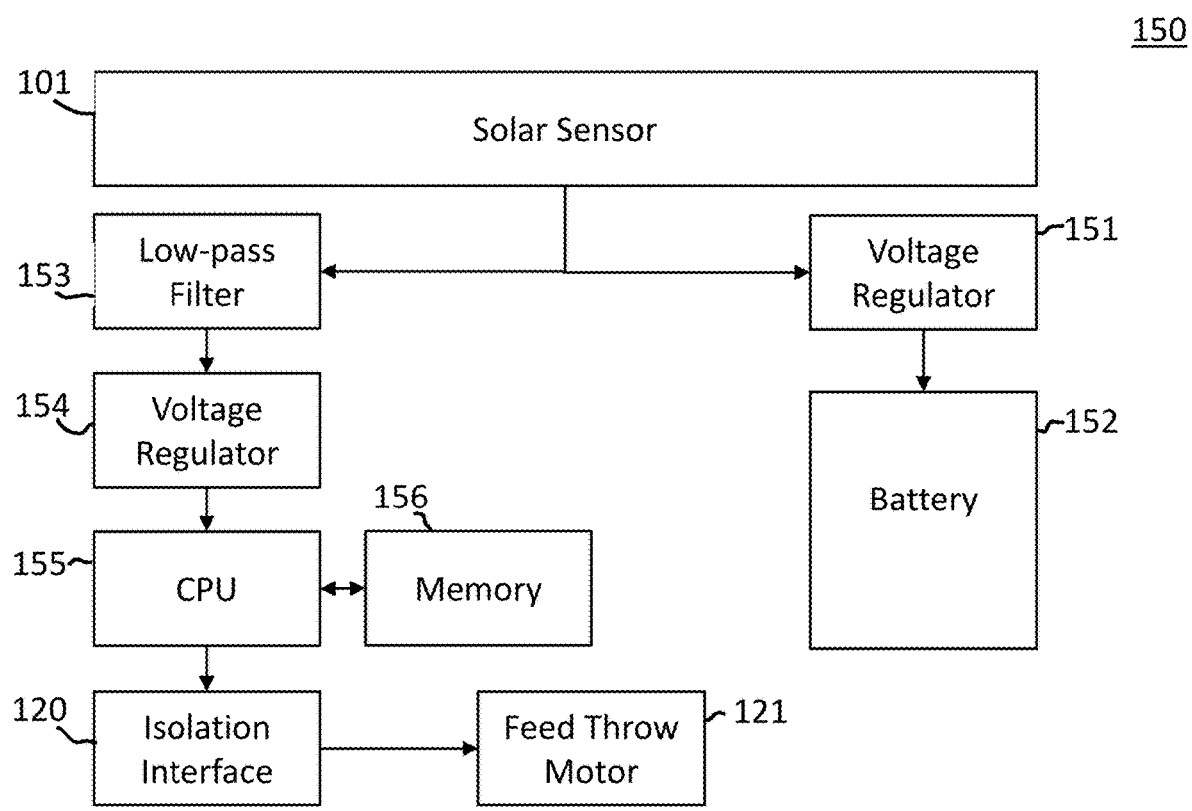
FIG. 1b illustrates a block diagram of a timing circuit, according to an embodiment.

FIG. 1*b* illustrates a block diagram of a timing circuit, according to an embodiment. System 150 comprises solar sensor 101, voltage regulator 151, battery 152, low-pass filter 153, voltage regulator 154, CPU 155, memory 156, isolation interface 120, and feed throw motor 121.

Voltage regulator 151 may provide regulated DC power generated by solar sensor 101 to charge Battery 152. The output of solar sensor 101 may feed through low-pass filter 153 to reduce or eliminate transient voltage spikes triggered by non-solar events, e.g., lightning flashes or automobile lights. Some solar panels also trigger intermittent voltages in low light environments. Voltage regulator 154 may boost the raw solar signal to produce a regulated solar signal. CPU 155 may read instructions from non-transient memory 156 to create a special purpose machine capable of performing the methods of the present disclosure. CPU 155 may be a microcontroller with built-in memory. CPU 155 may have an input to sample the regulated solar signal output by voltage regulator 154. The input may be a digital input. In some embodiments, CPU 155 may provide an analog input capable of sampling the regulated solar signal. In certain embodiments, CPU 155 may sample the raw solar signal from solar sensor 101 without intervening elements 153 and 154. CPU 155 may process the unregulated solar signal with a software implementation of a low-pass filter.

FIG. 2 illustrates a circuit for charging a solar panel and operating as a solar sensor, according to an embodiment. In FIG. 2, solar panel 201 may generate DC power to feed through resistor 202 to form a raw solar signal. The output of solar panel 201 may also feed voltage regulator 203 to boost and/or smooth the voltage to charge battery 204. To prevent leakage through the Blocking Diode, DB, a resistor may be connected from the Raw Solar Signal to Ground. Were it not for this aforementioned resistor, a false signal from the battery per se might be interpreted as daylight.

FIG. 3 illustrates a solar panel circuit operating as a solar sensor according to an embodiment. In FIG. 3, solar panel 301 may generate DC power to feed through resistor 202 to form a raw solar signal without charging a battery.

FIG. 4 illustrates a photovoltaic device operating as a solar sensor according to an embodiment. In FIG. 4, regulated power supply 403 provides power to solar sensor 401, which may be connected via resistor 402 to create raw solar signal. Solar sensor 401 may be a photovoltaic device, such as a photocell, solar cell, photo transistor, photo resistor, photo diode, or LED used as a photodiode. Some solar sensors 401 have a relatively small light acquisition area and may benefit from the addition of a Fresnel lens cap.

Visible light lies between the invisible extremes of the short wavelengths of ultraviolet (10 nm-400 nm) and the long wavelengths of infrared (700 nm-1 m), namely 400 to 700 nanometers. Sunlight includes the invisible spectra of both ultraviolet and infrared. Artificial light generally includes the visible spectrum but also may be biased towards ultraviolet or infrared. The spectral response of the Solar Sensor is important in respect to light intensity during various atmospheric conditions. Short wavelengths in the ultraviolet range are more easily transferred through clouds and fog, but Solar Sensors specific to ultraviolet suffer from a slightly higher cost compared to other Solar Sensors. Solar Sensors with a specific sensitivity response in the infrared range are more easily attenuated by clouds and fog but are inexpensive. Likewise, those that are specifically designed for the visible range are desirably inexpensive such as the Cadmium Sulfide photocell used in many Game Feeders.

Certain natural light spikes or an intermittent glow might falsely trigger a Solar Sensor in a Game Feeder. For example, variations in light may be caused by changing cloud cover, rain, fog, hail, snow, and/or lightning. Certain conditions may cause artificial light spikes. Artificial light spikes may be caused by the sweep of headlights on a passing car; the flash or illumination of game cameras; a headlamp or flashlight of a person walking by; and streetlights intermittently blocked by passing cars. In most instances, artificial light sources do not encompass much of the ultraviolet spectrum. Lightning is in a visible range, 600-700 nanometers.

FIG. 5 illustrates a solar filter circuit according to an embodiment. Solar filter circuit 500 may comprise operating voltage source 501, UV solar sensor 502, amplifier 503, isolation interface 504, and sensor 505. Operating voltage source 501 may be, e.g., a power supply connected to an AC mains, a disposable battery pack, a rechargeable battery pack, or the primary rechargeable batteries for the feeder. UV solar sensor may be a solar sensor tuned to capture UV spectrum light. UV solar sensor may be a broad-spectrum solar sensor couple with a filter to narrowly pass UV light. Isolation interface 504 selectively disconnects operating voltage source 501 from sensor 505 to prevent non-solar light from triggering the timer circuit. The circuit of FIG. 5 may be utilized with broad spectral range solar sensor 505 (e.g., a monocrystalline or polycrystalline solar cell and/or panel), which may be more sensitive to artificial light sources.

FIG. 6 illustrates an arrangement of solar sensors on a housing according to an embodiment. In some embodiments, multiple solar sensors 601 may be incorporated into game feeder housing 602. Solar sensors 601 may be connected in parallel or series such that each device contributes to the sunlight from other directions and is not blocked by vegetation, rocks, or other objects that would bias the output to a lower value from just one solar sensor. The improved characteristics of the illustrated embodiment is evidenced by the data in FIG. 12.

The preferred location for a game feeder may not allow the feeder to face the sun's path. In some embodiments, the solar sensor(s) 601 may be placed on a moveable structure relative to the fixed housing of this invention. The moveable structure could be, but not limited to, a flexible arm.

Solar Event

There are three Solar Events available in literature for sensing in the field of this disclosure: 1) Sunrise, 2) Sunset, and 3) Length of Daylight, namely the time-difference between Sunrise and Sunset. It is apparent that these Solar Events are directly related to the Dawn and Dusk activation points used by this disclosure. One object of this disclosure is to find the best singular Solar Event to monitor from the preceding day for this apparatus.

The tilt in the earth's axis relative to the sun, noted as approximately 23.5 degrees, is responsible for the seasons and the different Wall Clock Times for Sunrise and Sunset that change slightly from day to day in the habitable region between the Arctic and Antarctic Circles. It may be desired to choose one of the three solar events that has the least difference in time between successive days to predict a Pre-Dusk Feed Throw Time(s) for the next day. We would expect the extreme differences to be near the Arctic and Antarctic Circles, noted as latitudes 66 degrees, and the minimum difference at the Equator, latitude 0.0 degrees. Data was obtained for Nome, Ak.[2] (latitude 64.501 degrees); Quito, Ecuador[3] near the Equator (latitude 0.187 degrees); and Rio Gallegos, Argentina[4] (latitude 51.623 degrees). The difference between Sunrise, Sunset, and Length of Daylight for successive days versus the day of the year for 2019 is shown graphically in FIGS. 7-9. The maximum difference for the successive days is summarized in TABLE I, below. In one view, the best Solar Event to monitor has the least maximum difference between successive days, which is either Sunrise or Sunset and has a maximum difference of about 3.6 minutes. The Length of Daylight exhibits a greater maximum difference of about 6 minutes. Certain embodiments utilize the Sunset Solar Event (or a proximate time) to predict the Pre-Dusk Feed Throw Time(s) for the next day. Certain embodiments may utilize the Sunrise Solar Event to achieve the same goal.

[2] http://sunrise.maplogs.com/nome_ak_usa.35113.html
[3] http://sunsetsunrisetime.com/ecuador/1uito_5654.html
[4] http://sunrise.maplogs.com/r_o_gallegos_el_calafate_sabta_cruz_argentina.175124.html

TABLE I

| Maximum Successive Solar Differences | | | | |
|---|---|---|---|---|
| Location | Latitude | Max Δ SR | Max Δ SS | Max Δ DL |
| Nome, Alaska | 64.501 | 3.633 | 3.633 | 6.850 |
| Quito, Ecuador | 0.187 | 1.000 | 1.000 | 1.000 |
| Rio Gallegos, Argentina | 51.623 | 2.233 | 2.217 | 3.850 |

SR Sunrise
SS Sunset
DL Daylight Length (SS-SR)
Δ Difference in Minutes

FIG. 7 illustrates a graphical display of successive daily timed differences for sunrise, sunset, and daylight length for 2019 according to data from Nome, Ak.

FIG. 8 illustrates a graphical display of successive daily timed differences for sunrise, sunset, and daylight length for 2019 according to data from Quito, Ecuador.

FIG. 9 illustrates a graphical display of successive daily timed differences for sunrise, sunset, and daylight length for 2019 according to data from Rio Gallegos, Argentina.

FIG. 10 illustrates LED oscillations in certain solar panels.

Figure 11A:
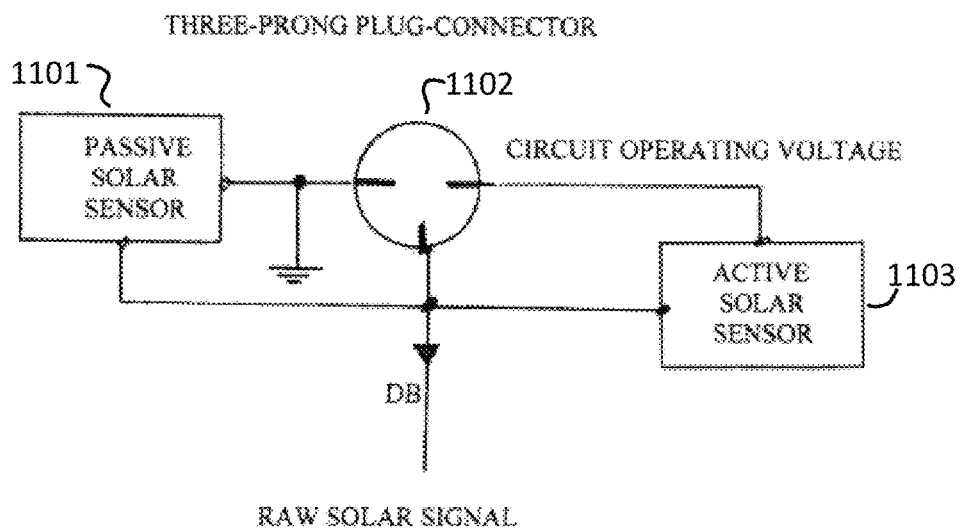
FIGS. 11a and 11b illustrate circuits for connecting a passive solar sensor and/or an active solar sensor to a timing circuit according to certain embodiments.
Figure 11B:
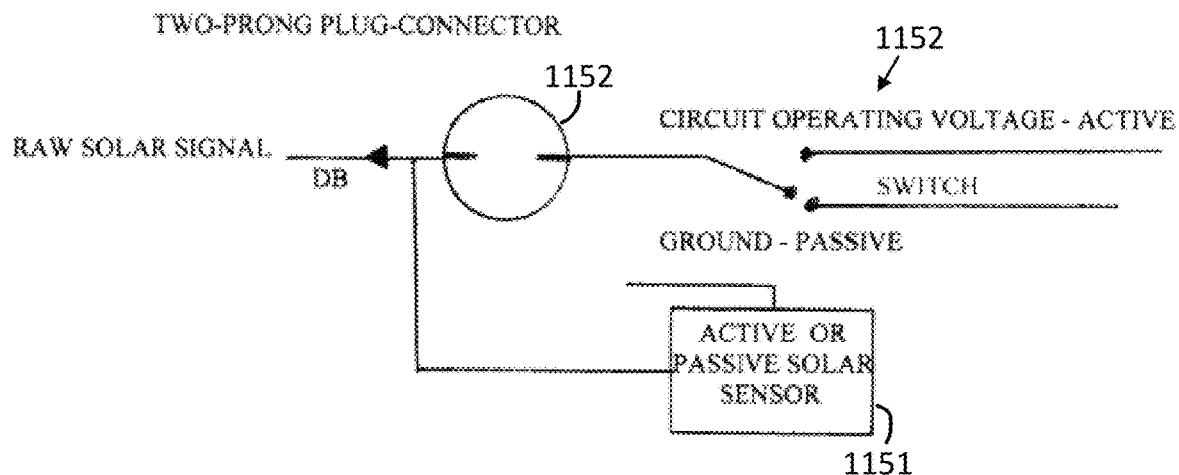

FIGS. 11a and 11b illustrate circuits for connecting a passive solar sensor and/or an active solar sensor to a timing circuit according to certain embodiments.

FIG. 12 illustrates a graphical display comparing the sensor quality of a single sensor embodiment with a multi-sensor embodiment. The data graphed in FIG. 12 was recorded from two embodiments. A first embodiment comprised one small 5.0 volt solar panel. A second embodiment comprised four small 5.0 volt solar panels installed on 90 degree quadrant points connected in a parallel circuit. The terminating impedance for the four parallel sensors were identical to that of the single sensor.

Figure 13:
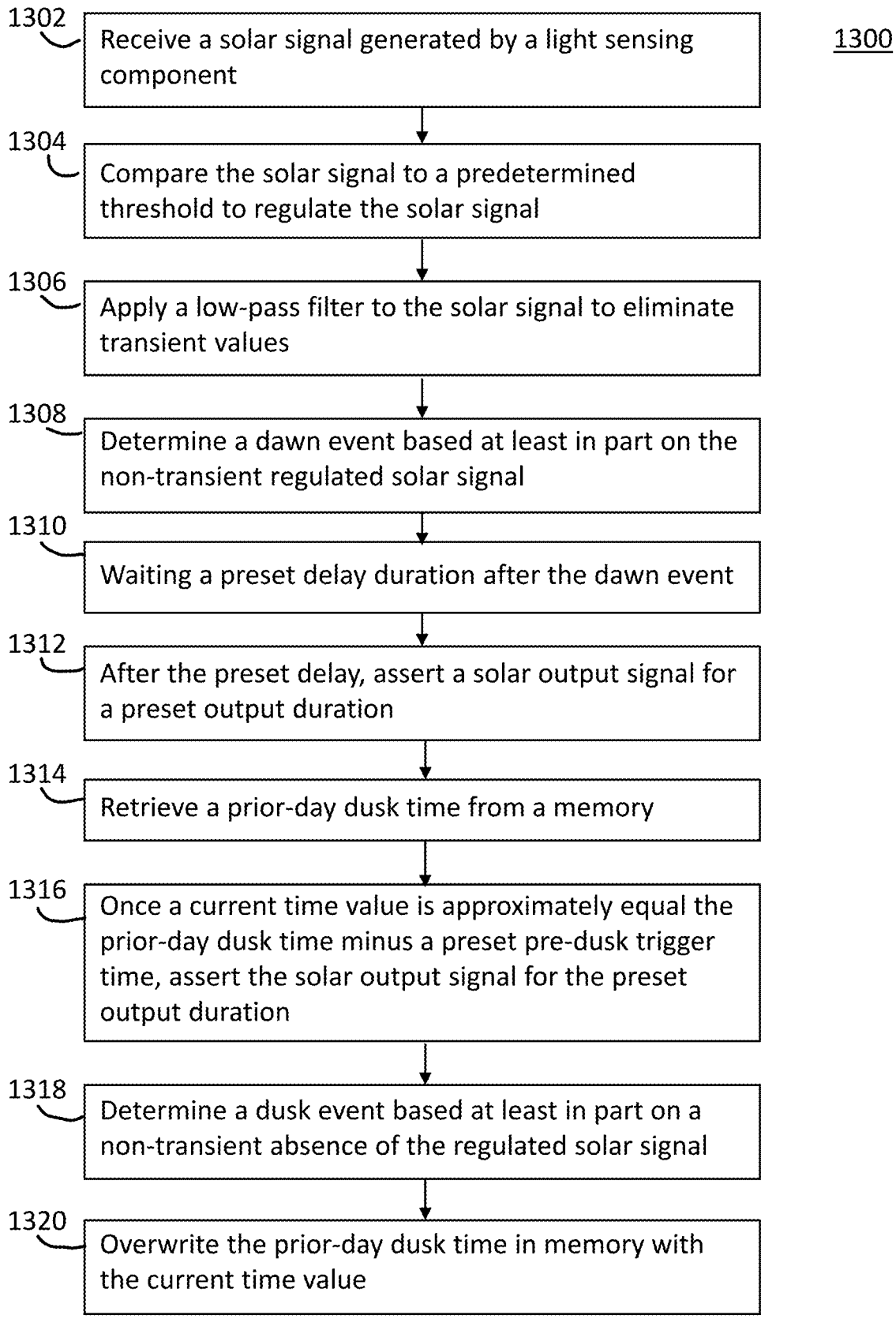
FIG. 13 illustrates a method for generating a timing signal, according to certain embodiments.

FIG. 13 illustrates a method for generating a timing signal, according to certain embodiments. At step 1302, a circuit receives a solar signal generated by a light sensing component. At step 1304, the circuit compares the solar signal to a predetermined threshold to regulate the solar signal. At step 1306, the circuit applies a low-pass filter to the solar signal to eliminate transient values. At step 1308, the circuit determines a dawn event based at least in part on the non-transient regulated solar signal. In some embodiments, step 1308 may be followed by a step of lowering the predetermined threshold to prevent subsequent false activations until dusk. At step 1310, the circuit waits a preset delay duration after the dawn event. At step 1312, after the preset delay, the circuit asserts a solar output signal for a preset output duration. At step 1314, the circuit retrieves a prior-day dusk time from a memory. At step 1316, once a current time value is approximately equal the prior-day dusk time minus a preset pre-dusk trigger time, the circuit asserts the solar output signal for the preset output duration. At step 1318, the circuit determines a dusk event based at least in part on a non-transient absence of the regulated solar signal. In some embodiments, the dusk event triggers a step of increasing the predetermined threshold to prevent false activations at night, e.g., those that might have otherwise been triggered by artificial or transient natural events. At step 1320, the circuit overwrites the prior-day dusk time in memory with the current time value.

In some embodiments, the method is performed on a microcontroller with a real-time clock. In some embodiments, the method is performed without calibrating the real-time clock to wall clock time.

Figure 14:
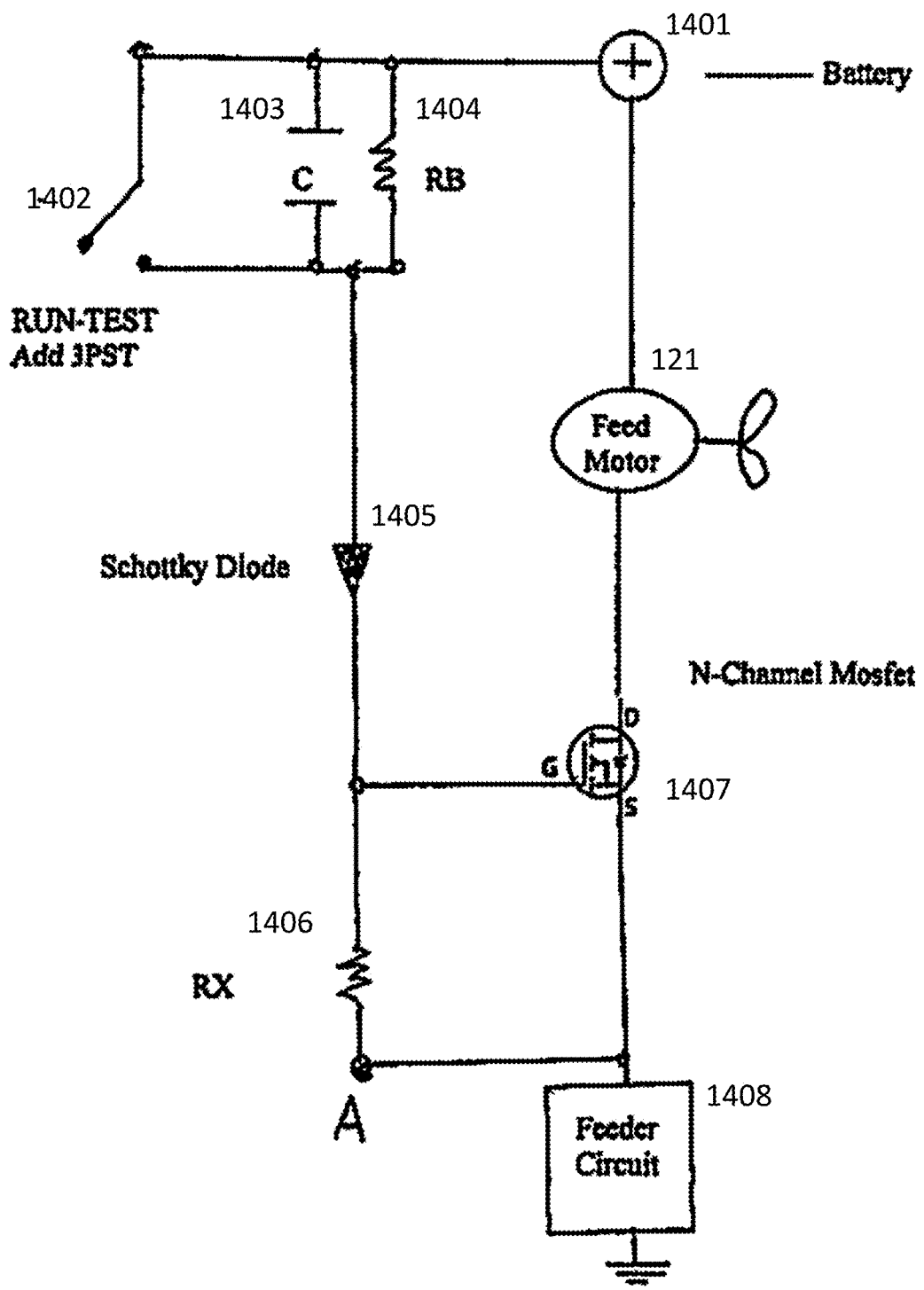
FIG. 14 illustrates an anti-dump circuit, according to certain embodiments.

FIG. 14 illustrates an anti-dump circuit, according to certain embodiments. Circuit 1400 comprises battery 1401, switch 1402, capacitor 1403, resistor 1404, Schottky diode 1405, resistor 1406, N-Channel Mosfet 1407, feeder circuit 1408 and feed motor 121.

One of the worst calamities to befall a game feeder installation is to find all of the feed contents dumped on the ground in one day. Many feeder circuits use a mosfet as the interface switch between the circuit and the feed motor. When mosfets fail, they generally fail in the full-on or partially-on position. The closer the max allowable amperage of the mosfet is to that of the motor's requirement, the greater the chance of failure. It is noted that the lower the max allowable amperage of the mosfet, the cheaper its cost. Many circuit manufacturers use the cheapest and least reliable mosfets available. And they do fail, and all the feed in the drum is thrown on the ground at once.

Some embodiments incorporate an anti-dump circuit that: 1) Is simple, 2) Contains few components, and 3) Is independent of the main feeder circuit. FIG. 14 illustrates an embodiment of such an anti-dump circuit. This circuit may be installed as a spliced item into the positive connection line to the feeder motor and does not utilize transistors in the feeder circuit. Likewise, note the few parts required: an N-Channel mosfet, Schottky diode, and two resistors.

In this illustrative circuit, when the feed motor is activated by the feeder circuit, point A goes near ground and capacitor, C, discharges through the gate of the N-channel mosfet for a timed period maintaining ON for the motor until the approximate 3 volt cutoff of the mosfet. At cutoff, the motor turns OFF. With the time period for ON being greater than the feeder circuit's ON, anti-dump occurs (motor turns OFF) when the feeder circuit fails in the full-on or partially-on position. Resetting the Capacitor, C, is via two methods. For testing, another pole and throw may be added to the current Run-Test switch in the feeder circuit to discharge C. After a test, etc., capacitor C, is reset by a bleed resistor, RB. For the circuit shown, the bleed-reset time is approximately 3-4 minutes as illustrated in Tables V-X.

TABLE V 12 volt Innovation Wildlife Motor

| | | | Time (seconds) | |
|---|---|---|---|---|
| $V_{Battery}$ | I(Amps)[5] | $V_{emf}$ | Mosfet A | Mosfet B |
| 12 | 1.46 | 9.08 | 28 | 31 |
| 9 | 0.98 | 7.04 | 25 | 30 |
| 6 | 0.82 | 4.46 | 18 | 24 |

TABLE VI

Constant Resistance load

| $V_{Battery}$ | I(Amps)[6] | Time (seconds) to turn off Mosfet A |
|---|---|---|
| 12 | 1.13 | 28 |
| 9 | 0.85 | 26 |
| 6 | 0.57 | 17 |

TABLE VII

Herters Ultimate Forage 6 volt Motor

| | | | Time (seconds) | |
|---|---|---|---|---|
| $V_{Battery}$ | I(Amps)[7] | $V_{emf}$ | Mosfet A | Mosfet B |
| 12 | 5.96 | Nil | >Max amps | 44 |
| 9 | 3.13 | 2.11 | 29 | 37 |
| 6 | 2.01 | 1.58 | 18 | 26 |

TABLE XI

Table V Configuration with Alternate RX and Alternate Mosfet B

| $V_{Battery}$ | Time (seconds) to turn off |
|---|---|
| 12 | 13 |
| 9 | 21 |
| 6 | 15 |

TABLE X

Table VII Configuration with Alternate RX and Alternate Mosfet B

| $V_{Battery}$ | Time (seconds) to turn off |
|---|---|
| 9 | 32 |
| 6 | 19 |

Tables V & VIII demonstrate that a large Rds=on for the mosfet will compress the run time range between different motor supply voltages, but less power is delivered by the feed motor. Also, the times and range are similar regardless of the nominal motor voltage or straight resistive load. Tables V & VIII demonstrate that for a small Rds=on for the mosfet, the range is greatly extended and times vary significantly between motor voltages. Essentially full power is delivered by the feed motor. Tables V & VIII demonstrate that with low Rds=on for the mosfet, it is noticed that the times are not too greatly different for the rated motor voltages (12 & 6 volts) being 31 and 26 seconds respectfully.
4. Tables IX & X demonstrate that with low Rds=on for the mosfet that, again, the times are not too greatly different for the rated motor voltages (12 & 6 volts) being 13 and 19 seconds respectfully.

[5] No load, battery connected directly to motor.
[6] Theoretical, connected to battery.
[7] No load, battery connected directly to motor.

If the normal feed time is set at a maximum of say 10 to 12 seconds and the battery voltage is identical to the rated voltage of the feed motor, components for the Anti-Dump Circuit can be set to allow no more than say 15 seconds offered during a main circuit failure.

Figure 15:
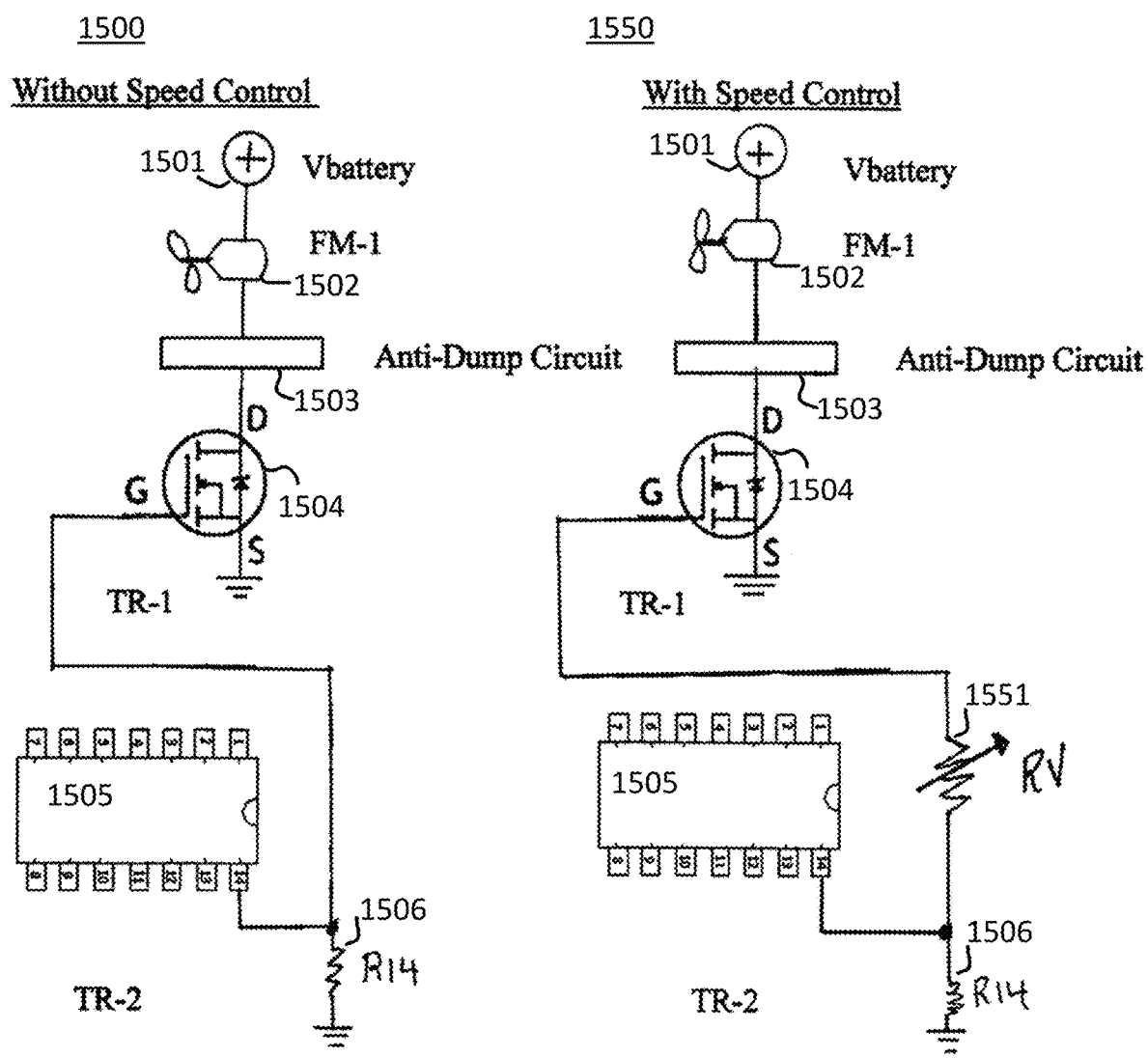
FIG. 15 illustrates timing circuits with and without speed control, according to certain embodiments.

FIG. 15 illustrates timing circuits with and without speed control, according to certain embodiments. Circuit 1500 illustrates a timing circuit, according to an embodiment without speed control. Circuit 1500 comprises Vbattery 1501, Feed Motor 1502, anti-dump circuit 1503, mosfet 1504, operational amplifiers 1505, and resistor 1506. Circuit 1550 further comprises variable resistor 1551.

In circuit 1500, the output from pin 14 on operational amplifiers 1505 goes high (~5V) and activates feed motor 1502 for a user-selected amount of time (seconds) through the gate of mosfet 1504. Resistor 1506 (R14) holds the Gate at ground when Pin 14 returns to zero.

With Speed Control, variable resistor 1551 (RV) may be added inline with gate 1504. In some embodiments resistor 1551 may be a DIP switch with selected resistor intervals. Resistors 1551 and 1506 drop the input voltage to the gate from ~5 Volts down to a value below the gate threshold voltage mosfet 1504 (−3.0 Volts). Less voltage than Vbattery is then supplied to feed motor 1502 thereby reducing the speed of the motor. A heat sink may be needed to maintain safe operating temperature for mosfet 1504.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

I claim:

1. A timing circuit comprising:
   a light sensing component operable to generate a raw solar signal,
   a solar signal regulator comprising a voltage regulator and a low-pass filter, the solar signal regulator coupled to the raw solar signal and generating a regulated solar signal,
   a comparator coupled to the regulated solar signal and a reference value, the comparator configured to assert a solar output signal when the regulated solar signal exceeds the reference value,
   a timing circuit coupled to the solar output signal and configured to:
   assert a timer output signal a preset delay duration after the solar output signal is asserted, and
   to maintain the timer output signal for a preset output duration, and
   a battery charging voltage regulator coupled between the raw solar signal and a battery connection terminal operable to supply a battery charging current.

2. The timing circuit of claim 1 further comprising an electrical isolation interface coupling the timer output signal with a power supply to drive a motor control output operable to drive a motor for throwing feed wherein the electrical isolation interface protects the timing circuit from induced power spikes produced by the motor.

3. The timing circuit of claim 2 comprising an anti-dump circuit coupled between the electrical isolation interface and the motor.

4. The timing circuit of claim 1 wherein timing circuit is further configured to decrease the reference value after the solar output signal is asserted.

5. The timing circuit of claim 1 further comprising:
   a sunset detection circuit selected from:
   an inverting input of an operational amplifier coupled to the regulated solar signal and the output coupled to a sunset signal,
   an input of an inverter coupled to the regulated solar signal and an output of the inverter driving the sunset signal, and
   a ripple counter with a clock input coupled to the regulated solar signal and an output of a fourth or higher stage driving the sunset signal; and
   a dusk counter measuring elapsed time, a reset input of the dusk counter coupled to the sunset signal; and
   a second timing circuit coupled to an output of the dusk counter and configured to assert the timer output signal upon assertion of the output of the dusk timer and configured to maintain the timer output signal for the preset output duration.

6. A timing circuit comprising:
   a light sensing component operable to generate a raw solar signal,
   a solar signal regulator comprising a voltage regulator and a low-pass filter, the solar signal regulator coupled to the raw solar signal and generating a regulated solar signal,
   a processor with an input coupled to the regulated solar signal and an output representing a solar output signal, and
   a non-transient memory coupled to the processor comprising instructions that when executed on the processor perform steps comprising:
   determining a dawn event based at least in part on a non-transient regulated solar signal,
   waiting a preset delay duration after the dawn event, and
   after the preset delay, asserting the solar output signal for a preset output duration.

7. The timing circuit of claim 6 further comprising an electrical isolation interface coupling the timer output signal with a power supply to drive a motor control output operable to drive a motor for throwing feed wherein the electrical isolation interface protects the timing circuit from induced power spikes produced by the motor.

8. The timing circuit of claim 6 further comprising a battery charging voltage regulator coupled between the raw solar signal and a battery connection terminal operable to supply a battery charging current.

9. The timing circuit of claim 6 wherein the light sensing component is selected from: an optical transistor coupled to a power supply, an optical resistor coupled to a power supply, a monocrystalline solar cell, a polycrystalline solar cell, a thin film amorphous solar cell, and a UV light sensor.

10. The timing circuit of claim 6, the memory further comprising instructions that when executed on the processor perform steps comprising:
retrieving a prior-day dusk time from the memory,
once a current time value is approximately equal the prior-day dusk time minus a preset pre-dusk trigger time, asserting the solar output signal for the preset output duration,
determining a dusk event based at least in part on a non-transient absence of the regulated solar signal and overwriting the prior-day dusk time in memory with the current time value.

11. The timing circuit of claim 10 wherein the current time value is the output of a real-time clock.

12. The timing circuit of claim 6 comprising a plurality of solar sensors wherein the outputs of the solar sensors are coupled to generate the raw solar signal.

13. The timing circuit of claim 6 comprising a plurality of solar sensors wherein each output of the solar sensors is:
coupled to a sensor-specific voltage regulator and a sensor-specific low-pass filter to generate a sensor-specific regulated solar signal coupled to a sensor-specific input to the processor.

14. A method of timing comprising:
receiving a solar signal generated by a light sensing component,
comparing the solar signal to a predetermined threshold to regulate the solar signal,
applying a low-pass filter to the solar signal to eliminate transient values,
determining a dawn event based at least in part on the non-transient regulated solar signal,
waiting a preset delay duration after the dawn event, and after the preset delay, asserting a solar output signal for a preset output duration.

15. The method of claim 14 further comprising:
retrieving a prior-day dusk time from a memory,
once a current time value is approximately equal the prior-day dusk time minus a preset pre-dusk trigger time, asserting the solar output signal for the preset output duration,
determining a dusk event based at least in part on a non-transient absence of the regulated solar signal and overwriting the prior-day dusk time in memory with the current time value.

16. The method of claim 15, further comprising:
after determining a dawn event, decreasing the predetermined threshold value, and
after determining a dusk event, increasing the predetermined threshold value.

17. The method of claim 16 wherein determining a dusk event is prevented if the absolute value difference between the current time and the prior-day dusk time is greater than four minutes.

18. The method of claim 14 further comprising:
receiving a second solar signal generate generated by a second light sensing component,
comparing the second solar signal to the predetermined threshold to regulate the second solar signal,
applying the low-pass filter to the second solar signal to eliminate transient values, wherein the step of determining the dawn event is further based on the non-transient regulated second solar signal.

19. A timing circuit comprising:
a light sensing component operable to generate a raw solar signal,
a solar signal regulator comprising a voltage regulator and a low-pass filter, the solar signal regulator coupled to the raw solar signal and generating a regulated solar signal,
a comparator coupled to the regulated solar signal and a reference value, the comparator configured to assert a solar output signal when the regulated solar signal exceeds the reference value,
a timing circuit coupled to the solar output signal and configured to:
assert a timer output signal a preset delay duration after the solar output signal is asserted, and
to maintain the timer output signal for a preset output duration, and
an electrical isolation interface coupling the timer output signal with a power supply to drive a motor control output operable to drive a motor for throwing feed wherein the electrical isolation interface protects the timing circuit from induced power spikes produced by the motor.

20. The timing circuit of claim 19 comprising an anti-dump circuit coupled between the electrical isolation interface and the motor.

* * * * *